United States Patent [19]

Resetarits et al.

[11] Patent Number: 5,407,605
[45] Date of Patent: Apr. 18, 1995

[54] FRACTIONATION TRAY WITH SIDE DISCHARGING TRIANGULAR DOWNCOMERS

[75] Inventors: Michael R. Resetarits, Depew; Daniel R. Monkelbaan, Amherst; Robert J. Miller, Niagara Falls, all of N.Y.

[73] Assignee: UOP, Des Plaines, Ill.

[21] Appl. No.: 167,297

[22] Filed: Dec. 16, 1993

[51] Int. Cl.$^6$ .............................................. B01F 3/04
[52] U.S. Cl. .................................... 261/98; 261/97; 261/113; 261/114.1; 261/114.3
[58] Field of Search ............... 261/97, 98, 113, 114.1, 261/114.3

[56] References Cited

U.S. PATENT DOCUMENTS

| | | | |
|---|---|---|---|
| 2,767,967 | 10/1956 | Hutchinson | 261/113 |
| 2,998,234 | 8/1961 | Haselden | 261/113 |
| 3,410,450 | 11/1968 | Bruckert | 261/113 |
| 4,101,610 | 7/1978 | Kirkpartrick et al. | 261/114.3 |
| 4,159,291 | 6/1979 | Bruckert et al. | 261/114.1 |
| 4,499,035 | 2/1985 | Kirkpatrick et al. | 261/114 JP |
| 4,504,426 | 3/1985 | Chuang et al. | 261/114.1 |
| 4,550,000 | 10/1985 | Bentham | 261/114.1 |
| 4,627,941 | 12/1986 | Bentham | 261/114.1 |
| 5,164,125 | 11/1992 | Binkley et al. | 261/114.1 |
| 5,244,604 | 9/1993 | Miller et al. | 261/114.1 |
| 5,262,094 | 11/1993 | Chuang et al. | 261/98 |

FOREIGN PATENT DOCUMENTS

| | | | |
|---|---|---|---|
| 233878 | 5/1925 | United Kingdom | 261/98 |
| 2232365 | 12/1990 | United Kingdom | |
| 1309998 | 5/1987 | U.S.S.R. | 261/114.1 |

OTHER PUBLICATIONS

Ballast tray design manual issued by Glitsch Incorporated (Bulletin No. 4900–fourth edition, copyright 1974).

Primary Examiner—Tim Miles
Attorney, Agent, or Firm—Thomas K. McBride; John F. Spears, Jr.

[57] ABSTRACT

High capacity, low cost fractionation trays comprise a flat perforated decking surface sectioned into parallel contacting areas by triangular downcomers. The bottom edges of two inclined sidewalls join together to form V-shaped downcomers having a limited number of perforations in their sidewalls to allow downward liquid passage. An imperforate zone is present in the central region of each sidewall. A layer of packing material may be provided close to or adjacent the bottom surface of the tray. The packing is located in the disengagement zone under the tray but does not extend downward to the next tray below.

12 Claims, 6 Drawing Sheets

FRACTIONATION TRAY WITH SIDE DISCHARGING TRIANGULAR DOWNCOMERS

FIELD OF THE INVENTION

The invention relates to gas-liquid contacting apparatus used primarily as fractionation trays for the separation of volatile chemical compounds in a fractional distillation column.

RELATED ART

U.S. Pat. No. 3,410,540 issued to W. Bruckert illustrates a fractionation tray design comprising alternating flat decking sections and downcomers. This tray design employs a conventional rectangular cross-section downcomer similar to that employed in one embodiment of the subject invention. FIG. 11 shows the use of a contacting deck which has a saw-tooth shape rather than the normal flat deck.

British Patent Specification 2,232,365-A illustrates a contacting column having layers of packing located under perforated contacting trays. The use of perforations in downcomer sidewalls to allow the descent of liquid onto the packing beds is mentioned.

U.S. Pat. No. 2,767,967 to M. H. Hutchinson illustrates a type of dual-flow tray referred to in the art as a ripple-tray. In this tray the rising vapor and descending liquid both pass through openings in the surface of the tray deck. The deck may have many topologies ranging from the sinosoidal curve of FIGS. 3 and 4 to the more planar shape of FIGS. 5 and 6. The variations in the elevation allow for less liquid depth on higher portions of tray which in turn allows for upward vapor passage, while liquid descends through the tray at points which allow for a greater liquid depth.

U.S. Pat. No. 4,499,035 issued to R. D. Kirkpatrick et al. is believed pertinent for its showing of an arrangement on the surface of cross-flow vapor-liquid contacting trays which employs both circular perforations and the vapor-directing slots on the decking panels of the tray.

The use of "anti-jump" baffles located above the inlet to an outlet downcomer is known in the art as illustrated by FIG. 10 in the ballast tray design manual issued by Glitsch Incorporated (Bulletin No. 4900—fourth edition, copyright 1974).

BRIEF SUMMARY OF THE INVENTION

The subject invention is a high capacity fractionation tray which employs downcomers having a triangular cross-section. The present invention provides a high capacity gas-liquid contacting apparatus possessing good efficiency with features reminiscent of ripple trays and Multiple Downcomer trays. The triangular cross-section downcomers extend downward only a portion of the distance to the next tray, with liquid exiting near the bottom of the imperforate downcomer sidewalls.

One embodiment of the invention may be characterized as a fractionation tray having upper and lower surfaces and comprising a perforated horizontal tray deck comprising a plurality of substantially planar elongated parallel vapor-liquid contacting areas; at least two downcomers, each downcomer bordering two of the planar vapor-liquid contacting areas and having an open rectangular inlet located on the upper surface of the tray and with at least one of said downcomers comprising a pair of planar sidewalls which are inclined at substantially equal angles from the tray deck such that the portions of sidewalls located furthest away from the lower surface of the tray deck join together to form a sealed V-shaped bottom portion of the downcomer; and, means to allow downward liquid flow from the tray comprising a row of openings in the downcomer sidewalls, with all of the openings being located in the one-third of the sidewall which is located furthest from the tray deck.

In some embodiments of the present invention a bed of structured or random (dumped) packing material is suspended below the horizontal decking of the tray, with the packing being wetted by liquid exiting the downcomers.

DETAILED DESCRIPTION AND PREFERRED EMBODIMENTS

Fractionation trays find utility in the separation of a wide variety of chemicals including hydrocarbons in petroleum refineries, petrochemical and chemical manufacturing plants. As with any useful industrial equipment, there are constant demands to improve the performance and lower the cost of the equipment.

Several different types of trays, each having its own advantages and disadvantages have been developed. One of the biggest disadvantages of some trays is the cost of manufacturing the tray, which is greatly influenced by the complexity of its design. The more pieces required to assemble a tray, the more it costs to fabricate and then assemble the pieces into the finished tray. Therefore a very simple tray, such as a dual flow tray, should have the advantage of low manufacturing costs. A dual flow tray typically comprises a flat deck with uniform perforations sized large enough to allow both liquid to descend and vapor to rise through the same openings. Dual flow trays therefore do not require downcomers or other accessories and are low in cost. However, dual flow trays tend not to work very well at tray diameters larger than four feet. Cross-flow trays use downcomers to achieve higher tray efficiencies but have the disadvantage of being more costly to fabricate and install. Ripple trays are similar to dual flow trays but have variations in the height of the tray deck as shown in previously cited U.S. Pat. No. 2,767,967. These variations provide depressions which allow liquid to collect and drain to the next tray much like a downcomer. Dual flow and ripple trays are also very sensitive to departures from the optimum (design) fluid flow rates.

It is an objective of this invention to provide a low cost high-capacity fractionation tray. It is a further objective of the invention to provide increased separation efficiency in high capacity fractionation trays.

The subject trays have large flat tray deck areas reminiscent of dual flow trays but also have depressed areas similar to ripple trays. The depressed areas however are partially blanked-off sections or are formed from substantially imperforate sidewalls with openings for liquid flow being provided only in selected regions of the sidewall including near the bottom portion of these depressed areas. The subject trays also differ from some other trays in that they can have a high percentage of open area—the area provided by perforations in the tray deck—on the order of about 40%, like dual flow trays. This open area can range from 35–45%. In contrast a normal cross-flow sieve tray or a Multiple Downcomer tray will usually have an open area less than about 20%. Another characteristic of the subject invention is the use of relatively large perforations on the order of 0.95–1.3 cm ($\frac{3}{8}$–$\frac{1}{2}$ inch) diameter in the case of round openings as compared to the typical sieve tray opening of about 0.5 cm (3/16 inch) diameter.

As the invention relates to the design of a downcomer which is only one part of a tray, there are a wide variety of different overall tray constructions which can employ the invention.

Figure 1:
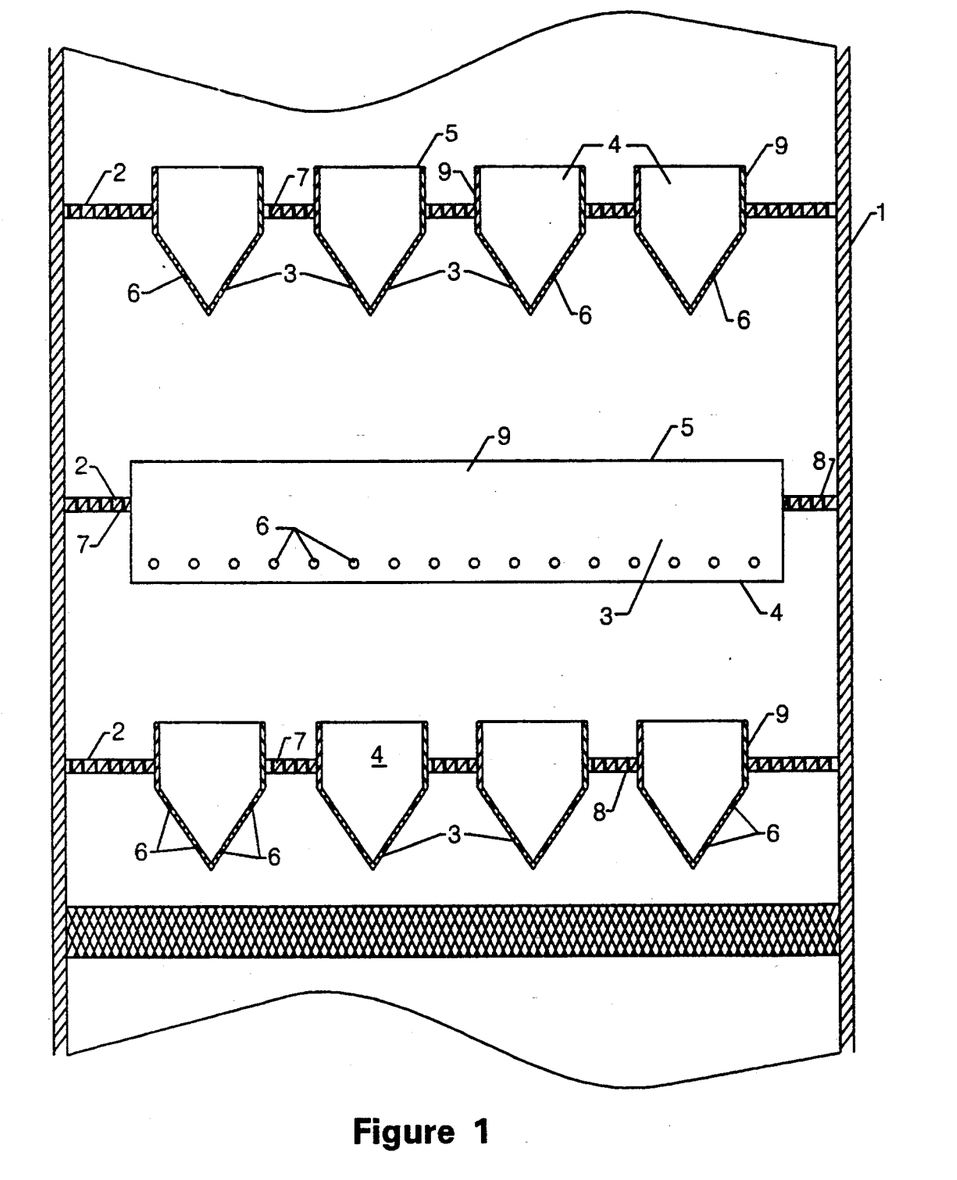
FIG. 1 is a diagrammatic, sectional side view of one embodiment of the subject gas-liquid contacting apparatus employed as a part of a fractionation column 1.

The accompanying drawings illustrate by way of example some embodiments of the present invention. Referring now to FIG. 1, there is shown a portion of a gas-liquid contacting apparatus comprising a cylindrical outer vessel, generally designated 1, employed as a fractionation column. A feed stream containing a mixture of chemical compounds having different relative volatilities enters the column via means not shown and falls onto a fractionation tray 2. The column contains a plurality, e.g., 10–300 of these fractionation or frothing trays located at uniform vertical intervals within the interval volume of the outer vessel. In the embodiment of our invention shown in this Figure each tray 2 comprises four trough-like downcomers having a triangular cross section spaced across the tray, with sections of planar tray deck 8 being adjacent each downcomer sidewall 3. Vapor rises upward through perforations 7 in the deck sections of the tray. Liquid descends through the column and is collected on each tray in the downcomers, with a portion of the liquid jetting out of perforations 6 in the downcomer sidewall.

FIG. 1 also illustrates the use of an optional bed 13 of packing located beneath a lowermost tray deck. That is, the tray may be modified by the addition of packing between and below the downcomers as desired. The perforations in this instance are employed as a means to spread liquid onto the packing bed(s). The packing 13 may consist of individual beds which fill the volumes between adjacent downcomers and also extend a short distance below the bottom of the downcomers.

The great majority of each downcomer is located below the horizontal plane of the tray with only a smaller portion located above the tray. Optional vertical walls 9 may extend above the tray and terminate with a straight upper edge 5 which functions as the inlet weir to the downcomer.

As also shown in FIG. 1, the downcomers on a particular tray are oriented perpendicular to those on the vertically adjacent trays. Thus in the view shown in the Figure one is looking endwise down the length of the downcomers on the top and bottom trays but across the downcomer toward a sidewall on the middle tray. This is a normally optimal design configuration but can be departed from if desired.

The trays of the subject invention have some structural features similar to Multiple Downcomer trays such as described in the previously cited U.S. Pat. No. 3,410,540 to W. Bruckert. For instance, the subject tray does not have a "receiving pan". This is the normally imperforate section located below an inlet downcomer opening. A receiving pan is the imperforate area of a tray upon which the liquid descending through the downcomer impacts before passing horizontally onto the decking of the tray. Often the receiving pan is separated from the active decking area of the tray by an inlet weir. Receiving pans are therefore normally located directly below the downcomer leading from the next above conventional fractionation tray. The horizontal surface area of the present fractionation tray is divided into depressed areas functioning as downcomer means and flat vapor-liquid contacting area normally referred to as decking. There are no imperforate areas allocated to receiving descending liquid from the tray located immediately above.

Figure 4:
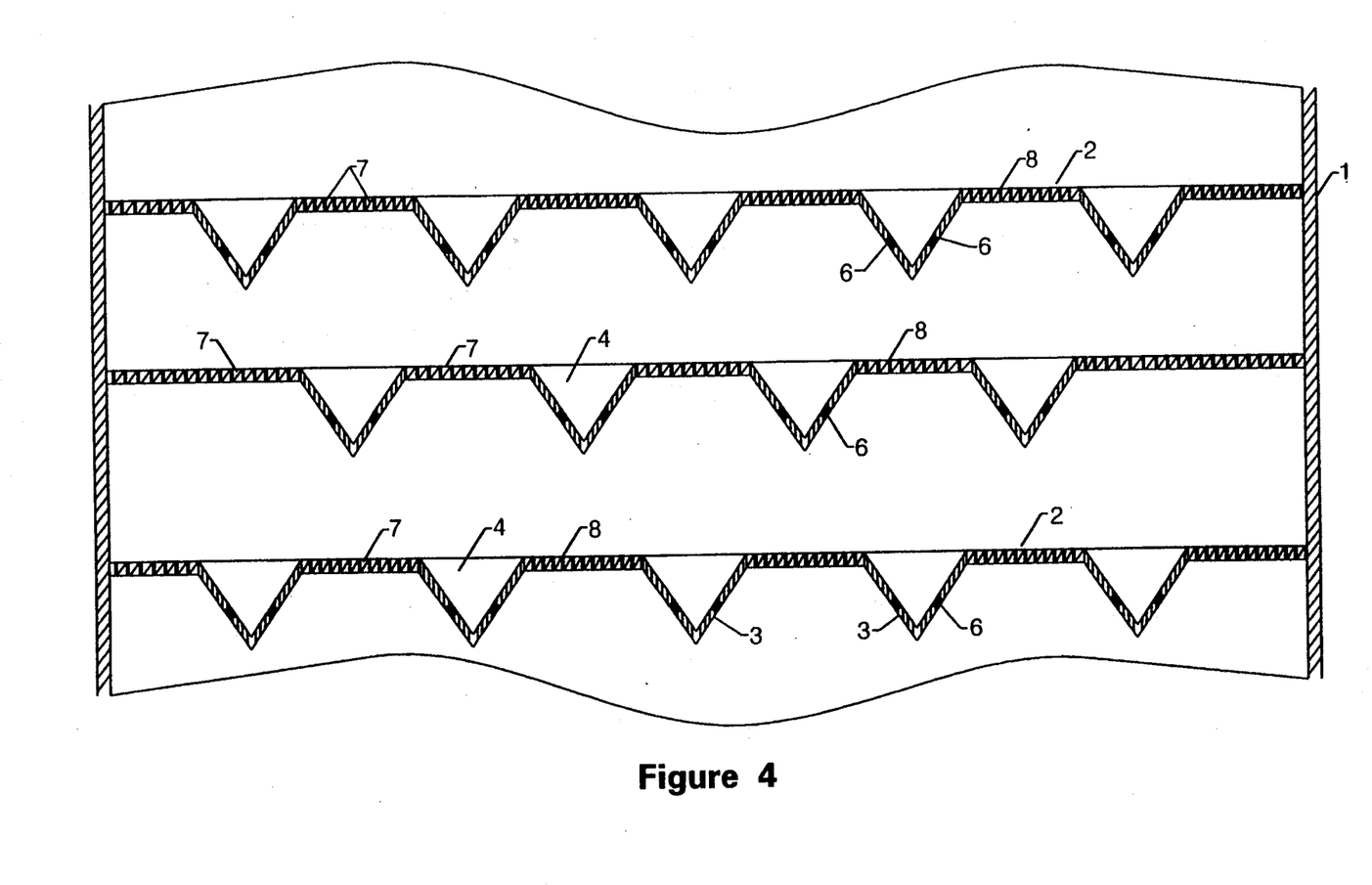
FIG. 4 is a diagrammatic, sectional side view of a column 1 containing three fractionation trays arranged according to another embodiment of the invention.

Another distinguishing feature of the subject fractionation trays is the provision of a relatively large number of the triangular cross-section downcomer means across the tray. The trays can employ from one to fifteen or more downcomers. These downcomer means are spaced relatively close together compared to the customary crossflow fractionation trays as they are spread across the surface of the tray rather than being at the periphery of the tray. The distance between adjacent downcomers (measured between their sidewalls) of the same tray will be between 0.2 and 1.0 meters and preferably less than 0.5 meter. This results in a tray having a unique design consisting of the alternating decking areas and downcomer means evenly spaced across the upper surface of the fractionation tray, as shown in FIGS. 1 and 4.

The downcomer means of the subject trays are also unique compared to the downcomers employed upon normal cross-flow fractionation trays. The downcomer means do not extend downward to the next fractionation tray. Rather they stop at an intermediate level located between the two trays. The downcomer descending from the tray above therefore stops well above the deck surface of the lower tray and the inlet to the downcomers of the tray below. The top or inlet to the downcomer of the tray functions as the outlet weir of the tray, and the bottom of the downcomer of a multiple downcomer tray above is therefore well above the outlet weir of the tray located below. Thus there is no inlet weir at the bottom of the downcomer of the tray as there is on a cross-flow tray.

Another distinguishing feature of Multiple Downcomer type fractionation trays is the provision of a liquid sealable means near the bottom of the downcomer means. The bottom of the downcomer means is closed off to retard the direct downward flow of liquid out of the downcomer means. This liquid sealable outlet is located well above the deck of the tray located immediately below and is at a level above the inlet of the downcomers associated with this next lower tray. The descending liquid is collected in the lower portion of the downcomer means and spills forth upon the next lower tray through openings in the side of the downcomer side walls.

The major embodiments of subject trays are similar to Multiple Downcomer trays in that they use a plurality of narrow, open-ended parallel downcomers to divide the tray deck into strips of planar decking. The downcomers do not extend to the tray below but instead terminate at an intermediate point. The subject trays are also similar to ripple trays in that a depressed portion of the tray deck is used for liquid transfer to the next lower tray. In the subject trays the depth of these depressions, that is, the depth of the triangular downcomers, is only from about 5–10 centimeters. Another difference from ripple trays is that these depressions are partially imperforate while ripple trays have very uniform perforations.

Figure 2:
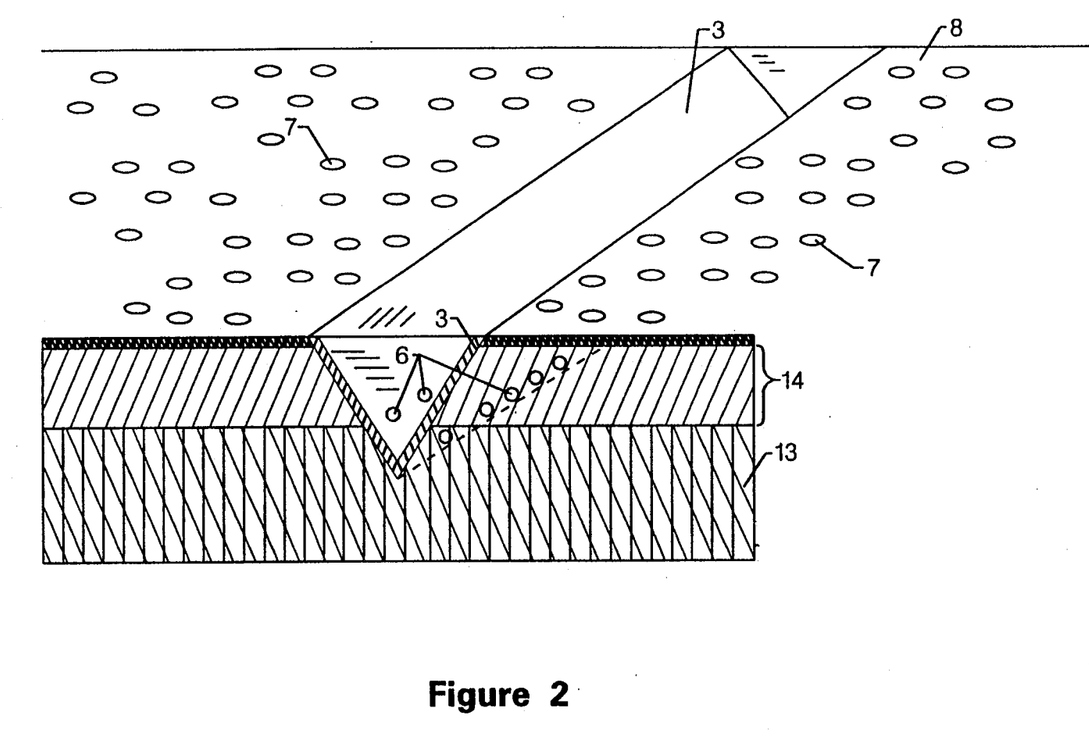
FIG. 2 is an enlarged, sectional isometric side view of a portion of a tray similar to the lowermost tray shown in FIG. 1 but with the packing 13 extending to a higher elevation.

FIG. 2 provides a better illustration of the preferred triangular cross-section of the downcomers which are formed from two opposing inclined sidewalls 3. The single row of spaced apart openings 6 in the bottom portion of the inclined sidewalls allows liquid to flow out of the downcomer toward the next lower tray. Several rows of holes can be provided if desired. Vapor flows upward through perforations 7 in the decking 8.

Figure 3:
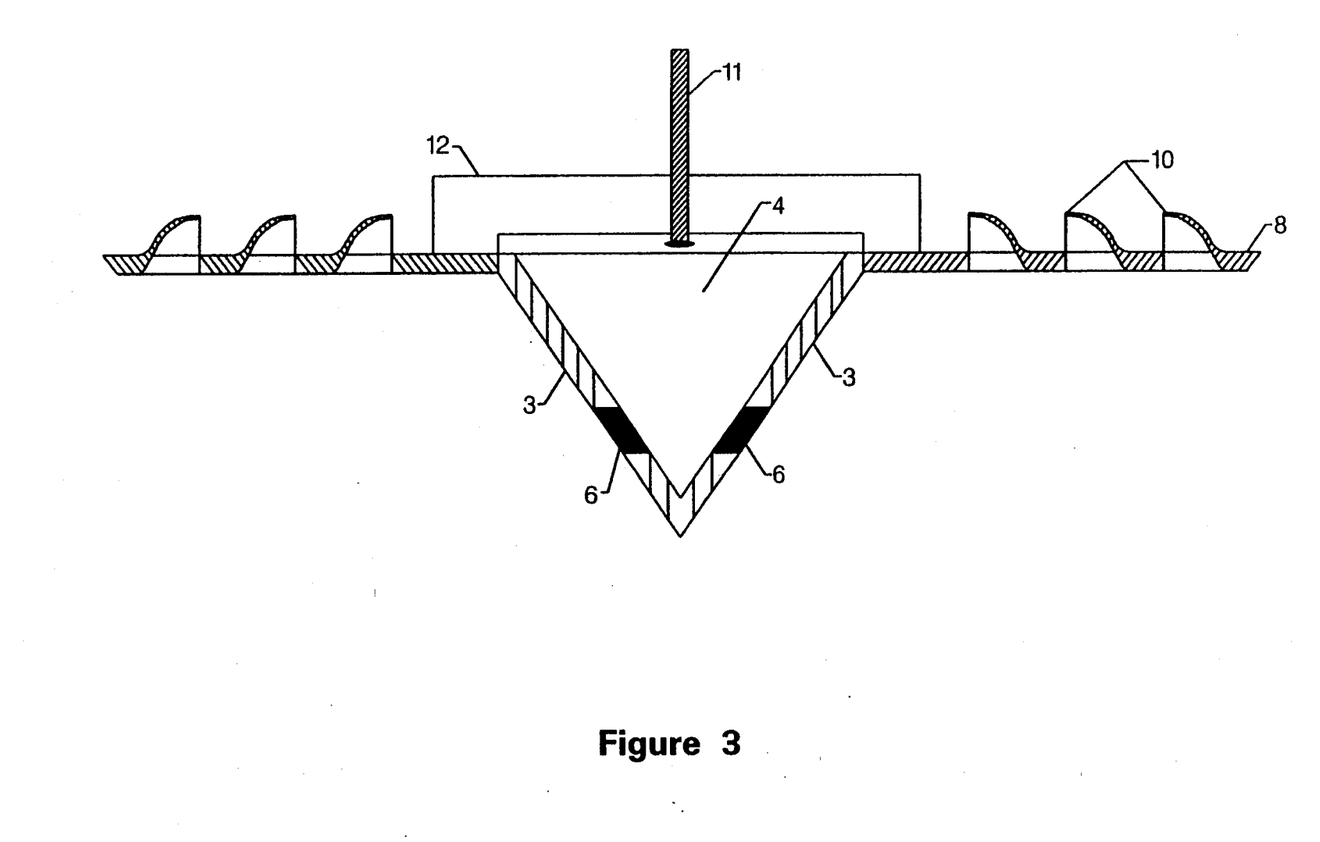
FIG. 3 is a sectional view of a triangular cross-section downcomer showing details of two optional tray variations including vapor-directing slots 10.

FIG. 3 presents a cross-sectional sideview of a small portion of a tray with a single triangular downcomer. The perforations in the tray deck 8 are provided by vapor-directing slots 10 formed by a mechanical pressing and cutting operation. A detailed view of a flow directing slot is presented in FIG. 5 of U.S. Pat. No. 4,101,610 and in FIG. 6 of U.S. Pat. No. 4,499,035. These slots are employed in one embodiment of the invention to cause the froth which forms on the surface of tray deck to move toward the downcomer inlet. This is intended to increase the capacity of trays. In addition a vertical substantially imperforate wall or baffle 11 supported by members 12 may be centrally placed over the downcomer inlet to intercept horizontally flowing froth, thus increasing the capacity of the tray.

The perforations 6 in the downcomer sidewalls are preferably arranged in a single row running along the major axis of the downcomer of a tray having flat decking areas. It is preferred that the holes are located in the sidewalls rather than along the bottom of the V-shaped downcomer. This helps impart horizontal velocity to the egressing liquid causing it to travel away from the downcomer. This is beneficial in spreading the liquid over any packing 13 which is located below the tray hence ensuring more uniform wetting of the packing and is also useful in directing the liquid onto the decking areas of the tray below depending on the orientation and location of the lower tray decks.

The perforations in the downcomer sidewalls are preferably circular but could have other shapes including horizontal or diagonal slots. The use of a smaller number of larger perforations is preferred although the perforations should be located more or less uniformly along the length of both sidewalls of the downcomer in a single row. Circular openings of about 0.5–2.5 centimeters diameter are suitable. Another important factor in the placement of the downcomer perforations is the provision of an adequate distance between the upper surface of the tray, which is normally coextensive with downcomer inlet, and the perforations to allow the entering froth to separate into clear liquid and vapor. This is important to good tray efficiency and performance in general. This distance should also provide sufficient liquid head to prevent the upward passage of vapor through the downcomer perforations. This desirable placement of the downcomer perforations can be characterized as being in the lower third of the downcomer sidewall.

The deck portions between the downcomers is preferably substantially planar; that is, flat and horizontal. These decking portions are preferably provided with uniformly distributed openings of adequate total cross-sectional area to allow the expected vapor flow to pass upward through the tray at a reasonable velocity. Uniform circular openings of a standard sieve tray are preferred but can be supplemented by the vapor flow directing slots of FIG. 3. The open area provided by deck perforations may be as high as 30–45% of the tray deck, as compared to a lower area of up to 20% normally used on ripple trays. The circular perforations may be up to ½ inch (1.27 cm) in diameter.

Figure 6:
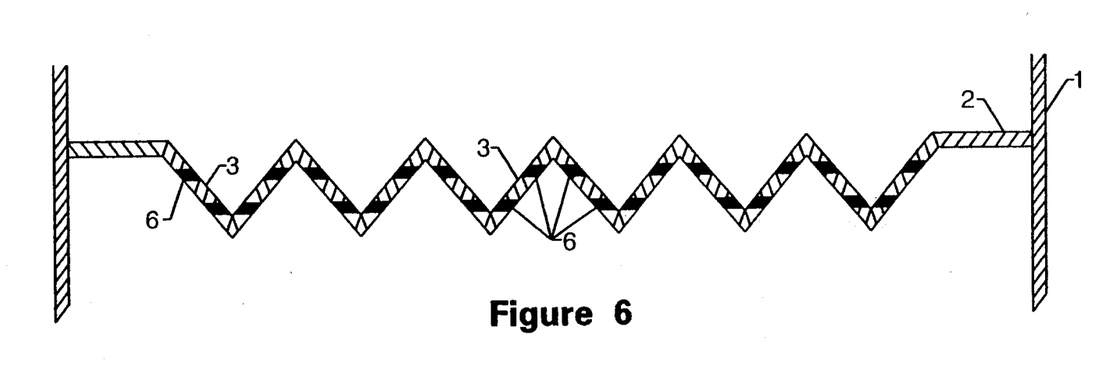
FIG. 6 is a sectional side view of a fractionation tray formed from adjoining V-shaped channels.
Figure 7:
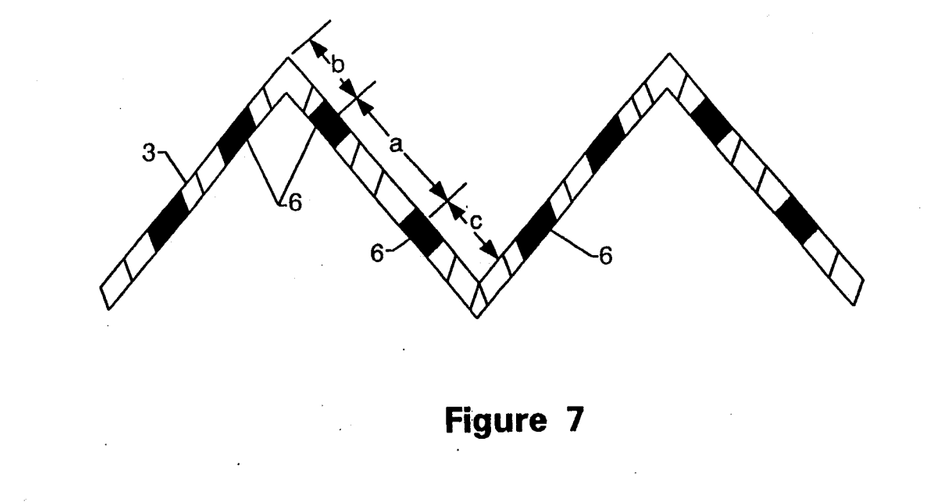
FIG. 7 is an enlarged view of a section of the tray shown in FIG. 6.

FIGS. 6 and 7 illustrate a unique embodiment which has no significant horizontal surface on the vapor liquid contacting area of the tray. The tray of this embodiment, as shown best in FIG. 6, is composed of a number of adjacent V-shaped structures which are attached to one another. FIG. 7 is an enlargement of a portion of the tray of FIG. 6, showing the added upper row of perforations not needed in the embodiment of FIG. 1. The inclined sidewalls 3 join another sidewall at both the upper and lower edges of the sidewall, which are horizontal when the tray is in use. Each sidewall will have at least an upper and a lower row of openings 6. The upper row allows vapor to pass upward through the tray. The lower row of openings functions as the openings in the bottom of the downcomer through which liquid drains downward to the next tray.

The openings 6 are grouped into two spaced apart rows in the sidewall to leave an imperforate central region which runs the length of the sidewall (across the column) from one face of the inner surface of the column to the opposing face. Three or more rows of openings can be placed at different heights from the lower edge but preferably the openings are staggered such that they do not lay above one another when viewing the broad surface of the sidewall. The distance "a" between the center lines of the upper and lower openings 6 should be ⅓ to ⅔ of the total height (a+b +c) of the sidewall. A sidewall with a greater height is not inclined as much from the horizontal as equal inclines would lead to greater liquid accumulations on the tray. The vertical distance between the downcomer inlet and the liquid outlet perforations near the bottom of the downcomer should be in the general range of 5–13 cm.

Figure 5:
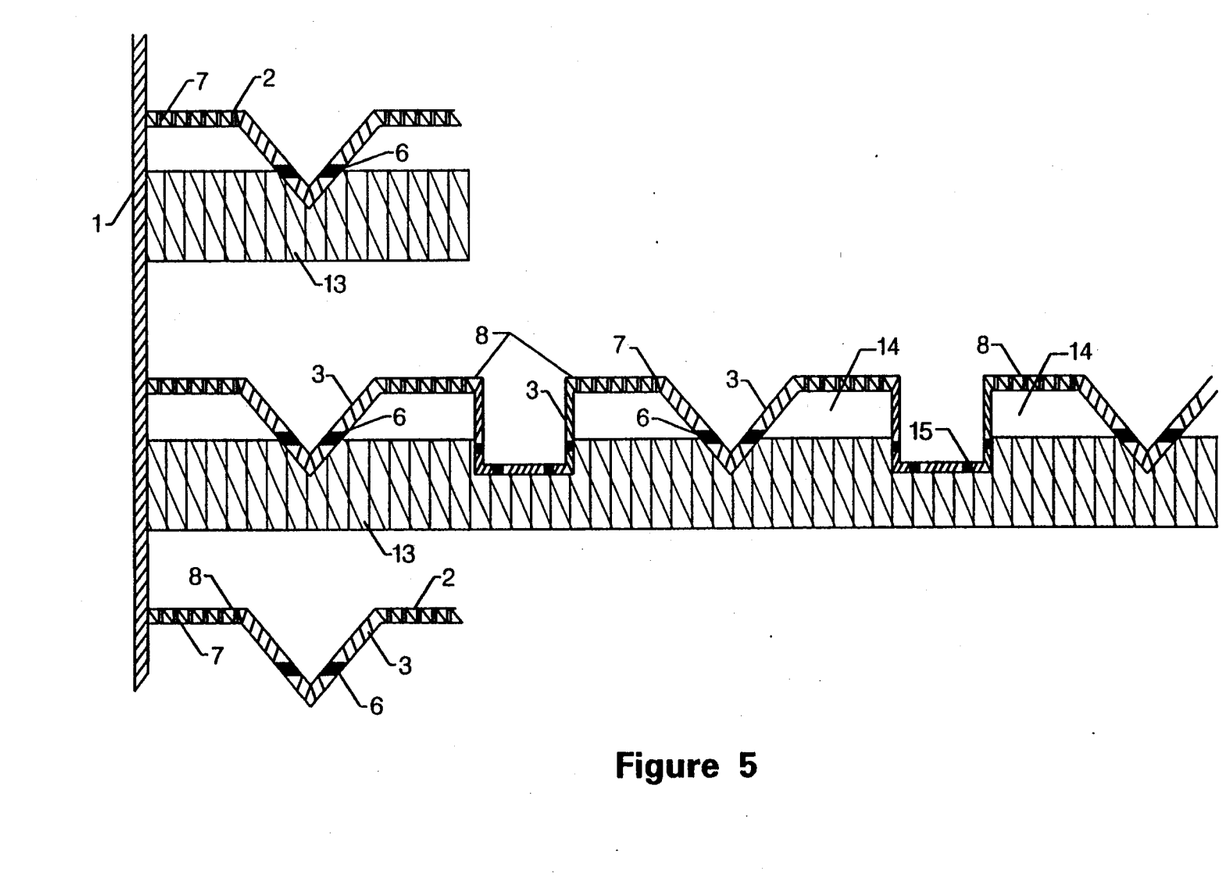
FIG. 5 is a sectional side view of a portion of a column employing both triangular and rectangular cross-section downcomers plus packing beds 13 below the tray decks.

FIG. 5 illustrates a portion of a fractionation column comprising all of one tray 2 and parts of the next higher and lower trays 2. The trays differ from those of the other Figures in that downcomers having both triangular and rectangular cross sections are employed. The sidewalls 3' of the rectangular downcomer are vertical and therefore perpendicular to the tray deck 8. Each rectangular downcomer has a planar bottom plate 15 having openings for downward liquid flow. This Figure more clearly illustrates the preferred gap 14 between the lower surface of the decking 8 and the upper surface of the bed of packing 13.

On the middle tray the packing rises above the sidewall openings 6 which hinders the horizontal distribution of the liquid. From this standpoint the arrangement of FIG. 1 with the packing being located below the bottom of the downcomers is preferred. Depending on the horizontal distance between the adjacent downcomers, it may be desirable to promote downward liquid flow through the perforations 7 normally limited to upward vapor flow. This would aid in maintaining a uniformly wetted bed of packing. A further feature of FIG. 5 is the lack of any inlet weir at the upper end of the downcomers.

In FIG. 4 there is shown a portion of a casing (outer vessel) 1 containing three structurally simple trays 2. Each tray comprises four or five triangular cross-section downcomers which are aligned parallel to the downcomers on the next higher and lower trays. The downcomers are formed by sidewalls 3 inclined at equal angles from the horizontal decking 8 to form an angle α of from 20 to 90 degrees. The downcomers of vertically adjacent trays are offset horizontally. This preferred horizontal offset assures that the liquid descending from the openings 6 in the downcomer sidewall 3 will fall onto decking 2 of the tray below rather than into the open inlet of the downcomers of the next tray. As the liquid exiting the downcomer sidewalls will travel horizontally for several inches, the downcomers could be mounted directly over each other.

The packing-containing versions of the subject apparatus can be used in a variety of gas-liquid contacting operations including absorption, gas treating for impurity removal or other processes including fractional distillation. In each of these processes, gas rises upward through the column while liquid trickles downwardly through the packing in a well-distributed manner and emerges therefrom as droplets which fall onto the frothing trays. The droplets falling onto the frothing trays form a liquid level thereon some of which is frothed by the gas passing upwardly through the column. Some of the liquid on the tray may be allowed to escape through the decking perforations, or specifically provided openings, to form droplets which are well distributed over the packing.

Tests have shown that the packing sections need only be short, say 200 mm top to bottom, and so wall effects are insignificant. It may be noted there is no packing material on the surface of the frothing trays or in the volume immediately above the trays. This allows conventional frothing and liquid flow to occur.

The optional packing beds may contain random packings; e.g., rings, spheres, saddles, structured or ordered bed packings; e.g., corrugated, rolled, screens or plates. Examples of random and structured packings are provided in U.S. Pat. Nos. 5,200,119 and 5,132,056.

The apparatus according to the present invention can be in the form of a new apparatus or a modified existing apparatus. That is, an existing trayed column may be modified to employ the subject invention. Any known countercurrent tray arrangement; such as, for example, dual-flow trays, cross-flow sieve trays and Multiple Downcomer trays may be used.

One embodiment of the invention may be characterized as a gas-liquid contacting apparatus comprising a pair of fractionation trays comprising a upper and a lower tray, with each fractionation tray comprising a perforated tray deck having upper and lower surfaces and a plurality of downcomers spaced across the tray deck, each downcomer having a triangular cross-section defined by two planar sidewalls extending away from the lower surface of the tray deck with the planar sidewalls having a substantially imperforate central region extending along the central (major) axis of the sidewall and having a width equal to at least 50 percent of the surface area of the sidewall; a bed of packing material located between said pair of trays and above the upper surface of the lowermost tray; and, means to distribute liquid from the upper tray over the bed of packing material comprising a series of perforations located in the one third of each downcomer sidewall located furthest away from the upper tray deck.

The beds of packing material may be located in the normally open spaces located between and/or below adjacent downcomers. These beds may be retained by a single support screen at the level of the bottom of the downcomers or by a number of individual screens extending horizontally between the downcomers. As a further alternative the packing support screen may be located some distance below the bottom of the downcomers with the packing between the downcomers thus being part of a larger overall packing bed which extends upward between the downcomers as shown in FIGS. 2 and 5. A further variation is that the packing may be in the form of a single bed of uniform thickness suspended below the downcomers and above the next lower tray as shown in FIG. 1. In this embodiment the means to supply liquid to the packing bed comprises the perforations in the sidewalls.

Openings in the decking material may in addition also be used for this purpose. Some portion; e.g., 25–40 vol. % of the liquid flowing across the tray deck 8, may therefore flow downward through openings 7 in the deck to allow liquid to flow onto the packing 13. Those skilled in the art will recognize there are a number of ways to distribute liquid from the tray to the packing. It is preferred to avoid the use of any mechanically complex system involving conduits, pipes and valves, inclined troughs, etc. Liquid spread across the packing may be derived from a downcomer, a separate liquid collection area or from the tray deck itself. For most purposes it is preferred to utilize some form of "dual flow" tray decking. That is, the tray intentionally allows liquid to "weep" downward. Valving means known to the art may also be placed on the tray to regulate liquid and vapor flow and to accommodate variations in these flows due to changes in feed or reflux rates in the column.

The packing beds may be suspended by a porous woven wire screen. The screen itself may be held in place in a number of ways. The screen may rest on a grid or a plurality of support bars not shown which crisscross the internal volume of the column in a plane parallel to the tray. The screen or the individual packing elements may alternatively be suspended (hung) from the tray above. These mechanical details may be varied to suit individual situations and are not deemed a limitation on the inventive concept.

The upper surface of the packing bed is not shown being located adjacent (in contact with) the bottom surface of the tray deck. Contact of packing with deck openings is believed to aid weeping which could make such contact useful. The top of the packing may alternatively be from 1 to 8 centimeters below the tray as shown in FIGS. 2 and 5, with a gap of 2–3 centimeters being preferred. In this instance, the packing will also be in contact with at least a portion of the sidewalls of the downcomer and thus fill the normally empty volume located between adjacent downcomers. With a dumped packing the upper surface of the bed will be somewhat irregular. The packing material bed may be in the form of preassembled units which are installed under preexisting trays, fabricated in situ under trays or made as an integral part of the overall tray structure. Structured packing may be added to the tray as bundles or subassemblies which together form the packing bed. A dumped packing may be added to the bed through openings in the wall of the outer vessel or through openings in the tray deck above. This unstructured packing may also be preloaded in porous retaining baskets which are then installed under the tray.

The amount of packing used with any one tray is preferably equal in volume to less than 50 percent of the open volume of the column between the upper and lower trays of the pertinent tray pair. The packing bed of the subject invention preferably extends downward to within 8 centimeters of the intended upper surface of the froth on the next lower tray. The bottom of the packing is therefore well above the top of the next tray. A minimum bed thickness of 10 cm is desired, with beds up to 150 cm thick being contemplated. Thickness is measured downward from the lower surface of the upper tray. The subject packing bed therefore will not touch the next lower tray or interfere with fluid flow across the tray.

The packing used in the invention may be characterized as comprising a plurality of beds of packing material with each bed of said plurality being: (i) placed between a pair of trays; (ii) located closer to an upper tray than to a lower of said pair of trays; (iii) being equal in volume to less than one-half of the available volume in the outer vessel between the pair of trays; and, optionally (iv) at least partially filling the volumes located between the parallel downcomers.

The trays of the subject invention are fractionation trays as compared to liquid distributors found in packed columns. Some characteristics of fractionation types include: a closer vertical spacing for fractionation trays; a design which causes intimate, vigorous contact of liquid retained on the tray with vapor passing upward through the tray and the formation of froth on the surface of fractionation trays; and an abundance of closely spaced perforations across a high percentage of the decking area of the fractionation trays. Fractionation trays make no attempt to collect and segregate vapor and/or liquid flow before redistributing these phases. By its very nature, a packed column liquid distributor would have no use for downcomers which transfer liquid downward any appreciable distance before releasing it to the column.

All of the features disclosed in this specification and/or all of the steps of any method or process so disclosed, may be combined in any combination, except combinations where at least some of such features and/or steps are mutually exclusive. Each disclosed feature may be replaced by alternative features serving the same, equivalent or similar purpose, unless expressly stated otherwise.

What is claimed:

1. A fractionation tray adapted for being mounted horizontally in a vertical fractionation column, said tray having upper and lower surfaces and comprising:
   (a) a perforated tray deck comprising a plurality of substantially planar elongated parallel vapor-liquid contacting areas;
   (b) at least two downcomers, each downcomer bordering two of the planar vapor-liquid contacting areas and having a rectangular inlet located on the upper surface of the tray, and with at least one of said downcomers comprising a pair of planar sidewalls which are attached to and inclined at substantially equal angles from the tray deck such that the portions of the sidewalls furthest away from the lower surface of the tray deck join together to form a sealed bottom portion of the downcomer; and,
   (c) means to allow liquid flow from the tray comprising perforations in the downcomer sidewalls, with the perforations being located in the one-third of the sidewall which is located furthest from the tray deck and above said sealed bottom portion of the downcomer.

2. The tray of claim 1 further characterized in that each downcomer sidewall has an imperforate central region extending along the central axis of the sidewall.

3. The tray of claim 1 further characterized in that the perforations in the tray deck comprise vapor directing slots aligned to project vapor rising through the tray deck toward a downcomer inlet.

4. The tray of claim 1 further characterized in that a vertical baffle centered over a downcomer inlet extends away from the tray surface on the upper surface of the tray.

5. A fractionation tray comprising:
   (a) a perforated tray deck having upper and lower surfaces which are partitioned into elongated substantially planar parallel vapor-liquid contacting areas, lying in the plane defined by the tray deck, by at least two downcomers, each downcomer having a triangular cross section and being formed by a pair of substantially planar sidewalls which are inclined at substantially equal angles from the tray deck, with the sidewalls intersecting to form a sealed bottom portion of the downcomer;
   (b) a bed of packing material positioned below the tray such that at least the lower quarter of each downcomer sidewall is immersed in the bed; and,
   (c) means to distribute liquid from the tray over the bed of packing material comprising perforations in the downcomer sidewalls, with the perforations being located in the one-third of the sidewall which is located furthest from the tray deck and above said sealed bottom portion of the downcomer.

6. The tray of claim 5 wherein said means to distribute liquid over the bed of packing material also comprises perforations in the tray deck.

7. The tray of claim 5 further characterized in that each downcomer sidewall has an imperforate central region extending along the central axis of the sidewall.

8. A gas-liquid contacting apparatus comprising a plurality of the trays of claim 5 spaced vertically apart at uniform distances within a cylindrical outer vessel.

9. The apparatus of claim 5 further characterized in that at least the lower quarter of each downcomer is immersed in the bed of packing material.

10. A gas-liquid contacting apparatus comprising:
    (a) a pair of contacting trays comprising an upper and a lower tray, with each contacting tray comprising a perforated tray deck having upper and lower surfaces and a plurality of downcomers spaced across the tray deck between planar deck areas lying in the plane defined by the tray deck, each downcomer having a triangular cross-section defined by two planar sidewalls extending away from the lower surface of the tray deck and joining together to form a sealed bottom portion of the downcomer, with the planar sidewalls having a substantially imperforate central region extending along the central axis of the sidewall equal to at least 50 percent of the surface area of the sidewall;

(b) a bed of packing material located between said pair of trays and above the upper surface of the lowermost tray; and, (c) means to distribute liquid from the upper tray over the bed of packing material comprising a series of perforations located above said bottom portion of the downcomer but in the one third of each downcomer sidewall located furthest away from the upper tray deck.

11. A fractionation tray comprising:

(a) a plurality of parallel spaced-apart downcomers of triangular cross section formed from two planar sidewalls which are joined at a locus located away from the tray;

(b) a plurality of parallel spaced apart downcomers of rectangular cross section which are interspersed between said triangular cross section downcomers; and, (c) substantially planar perforated decking sections located between the alternating rectangular and triangular cross section downcomers.

12. The apparatus of claim 11 further characterized in that the decking sections have an open area of 30–45 percent.

* * * * *